United States Patent
Liu et al.

(10) Patent No.: US 9,064,317 B2
(45) Date of Patent: Jun. 23, 2015

(54) DETECTION OF NEAR-FIELD CAMERA OBSTRUCTION

(75) Inventors: Juan Liu, Cupertino, CA (US); Ajay Raghavan, Mountain View, CA (US); Robert R. Price, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 9 days.

(21) Appl. No.: 13/472,126

(22) Filed: May 15, 2012

(65) Prior Publication Data

US 2013/0308004 A1 Nov. 21, 2013

(51) Int. Cl.
| | |
|---|---|
| *G06T 7/00* | (2006.01) |
| *H04N 5/228* | (2006.01) |
| *H04N 5/262* | (2006.01) |
| *H04N 5/208* | (2006.01) |
| *H04N 5/225* | (2006.01) |
| *G06K 9/40* | (2006.01) |
| *G06K 9/48* | (2006.01) |

(52) U.S. Cl.
CPC ............. *G06T 7/0081* (2013.01); *G06T 7/0085* (2013.01); *G06T 2207/10004* (2013.01); *G06T 2207/20141* (2013.01); *G06T 2207/20224* (2013.01); *G06T 2207/30232* (2013.01); *G06T 2207/30236* (2013.01)

(58) Field of Classification Search
CPC ....... H04N 5/262; H04N 5/228; H04N 5/208; H04N 5/2622; H04N 5/2259; H04N 5/23229; G06K 9/40; G06K 9/48; G06K 9/00; G06T 2207/10004; G06T 2207/2024
USPC .................. 348/222.1, 252, 200.1, 205, 239; 382/199, 266, 254, 103
See application file for complete search history.

(56) References Cited

U.S. PATENT DOCUMENTS

| | | | |
|---|---|---|---|
| 8,073,261 B2 | 12/2011 | Skans | |
| 2007/0115357 A1* | 5/2007 | Stein et al. .................... | 348/148 |
| 2011/0085738 A1* | 4/2011 | Kitamura et al. ............. | 382/199 |
| 2012/0002868 A1* | 1/2012 | Loui et al. ..................... | 382/159 |
| 2012/0170808 A1* | 7/2012 | Ogata et al. ................... | 382/103 |

* cited by examiner

*Primary Examiner* — Tuan Ho
*Assistant Examiner* — Marly Camargo
(74) *Attorney, Agent, or Firm* — Fay Sharpe LLP

(57) ABSTRACT

A method (100) is provided for detecting an obstruction within a field of view of a camera (12) from an image (200) captured by the camera (12). The method (100) includes: analyzing the image (200) by applying edge detection (104) to the image (200), identifying (108) regions of the image (200) lacking edge content and comparing (112) a size of the identified regions to a threshold; and determining if there is an obstruction based upon a result of said comparison.

18 Claims, 4 Drawing Sheets

DETECTION OF NEAR-FIELD CAMERA OBSTRUCTION

BACKGROUND

The present inventive subject matter relates generally to the art of automated cameras. Particular but not exclusive relevance is found in connection with red light and/or other traffic cameras. Accordingly, the present specification makes specific reference thereto. It is to be appreciated however that aspects of the present inventive subject matter are also equally amenable to other like applications.

To capture high quality images with red light, traffic and/or other like automated and/or unattended cameras it is commonly desirable to have an unobstructed field of view (FoV) in which objects of interest may be located. Should the FoV be obstructed, objects of interest, e.g., such as vehicles, drivers and/or license plates, may not be accurately visualized and/or identifiable in images captured by the camera. For example, accurate visualization and/or identification of such objects in captured images are often important for law enforcement purposes and/or the issuing of traffic citation.

Over time, a camera's FoV may become obstructed by an object in the FoV near the camera. For example, while not initially present, obstructions near the camera may appear due to the growth of plant foliage, ice build-up on the camera lens or porthole, graffiti or debris on the camera lens or porthole, etc. Such obstructions can sufficiently block or obscure various regions sought to be captured in an image obtained by the camera. In turn, one or more objects of interest otherwise sought to be captured in such an image may not be sufficiently visualized and/or readily identifiable in the image. Accordingly, law enforcement or other actions reliant on accurate visualization and/or identification of one or more target objects in a captured image may be frustrated. Moreover, some more advance camera systems may be triggered to capture an image in response to events occurring in a scene observed by the camera, e.g., such as the detection of a vehicle or vehicle movement within the scene. Where such an event is obscured from view by an obstruction, the camera may not capture an otherwise desired image because the event was not detected.

Traditionally, operators of automated/unattended cameras such as those mentioned above relied on human labor-intensive practices to monitor, check and/or verify obstruction-free operation. For example, an operator may periodically or intermittently conduct a manual review of images obtained from a camera and visually inspect them for obstructions. Such an operator may commonly be assigned a significant number of cameras to check on a fairly frequent basis. Accordingly, such a process can be repetitive and prone to human oversight and/or error. Additionally, a maintenance technician may be assigned to manually inspect camera installations in the field at periodic or intermittent intervals. Again, this is a labor-intensive process prone to human oversight and/or error.

Alternately, automated methods have been developed to detect camera obstructions from an obtained test image. For example, one such method employs a reference image obtained from an unobstructed camera. In this case, the reference image and test image are subtracted from one another to detect variations therebetween, wherein a detected variation is then deemed indicative of an obstruction in the test image. Such subtractive methods, however, can have certain limitations and/or drawbacks. For example, in dynamically changing scenes, e.g., such as a traffic intersection, objects and/or object locations within the scene may vary from image to image. For example, different vehicles or pedestrians may appear in different images or appear at different locations within different images. Accordingly, by image subtraction from a reference which may not include the same dynamically changing elements, the resulting variations may falsely indicate an obstruction. Additionally, a change in the camera alignment and/or imaging conditions (e.g., such as illumination level) may produce variations in the subtracted image which can again lead to a false indication of an obstruction. Accordingly, such subtraction methods commonly have to account for dynamically varying scenes in order to accurately detect obstructions. The image subtraction and/or aforementioned accounting for dynamically varying scenes can be time intensive and may put further demands and/or complexity on a processor executing the same. Therefore, it has heretofore remained desirable to have an obstruction detection method that is not dependent upon a reference image in this manner.

Accordingly, a new and/or improved method, system and/or apparatus for monitoring, detecting and/or reporting obstructions in a camera's FoV is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for detecting an obstruction within a field of view of a camera from an image captured by the camera. The method includes: analyzing the image by applying edge detection to the image, identifying regions of the image lacking edge content and comparing a size of the identified regions to a threshold; and determining if there is an obstruction based upon a result of said comparison.

In accordance with another embodiment, a method is again provided for detecting an obstruction within a field of view of a camera from an image captured by the camera. The method includes: analyzing the image with a computer processor to identify regions of the image which are out of focus; comparing a size of the identified regions to a threshold; and determining if there is an obstruction based upon a result of said comparison.

In accordance with still another embodiment, a camera system includes: a camera that obtains an image; and an image processor that analyzes the image to determine if there is an obstruction in the camera's field of view. Suitably, the analyzing includes: applying edge detection to the image; identifying regions of the image lacking edge content; comparing a size of the identified regions to a threshold; and determining if there is an obstruction based upon a result of said comparison.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Generally, the present specification describes a method, process, apparatus and/or system for detecting a near-field obstruction within a camera's FoV that is reference-image independent, i.e., it does not utilize a reference image for the purpose of such detection. In practice, the described method, process, apparatus and/or system employs edge detection over an image captured by the camera and computes or otherwise determines or measures a local edge density of the image with an appropriately sized window. Suitably, a region of interest of an image scene is largely in focus under nominal (i.e., not obstructed) conditions. Consequently, the features are sharply captured and exhibit certain homogeneity in edge density or more generally regions with high local gradients. Conversely, an obstruction that is sufficiently near-field compared to the focusing range is generally not in focus. Consequently, the features of the obstruction are blurred and there is a significant reduction in edge density. Accordingly, an image quality metric that reflects the edge density of an observed image is used to detect near-field obstructions, e.g., by comparing a result of the metric to a threshold value. Suitably, the threshold value may be learned from a training set of images with and without near-field obstructions.

As used herein, the terms edge generally refers to a location or pixel which exhibits a relatively high local gradient or value difference with respect to a neighboring location or pixel or pixels such as is typically found at the edge of an in-focus object. The term edge as used herein more generally includes any such features exhibiting the foregoing properties, e.g., such as a corner or the like. Additionally, the term edge detection as used herein more generally includes not only the detection of edges but also the detection of corners and/or other like features exhibiting the foregoing properties and/or the detection of the foregoing properties themselves.

Figure 1:
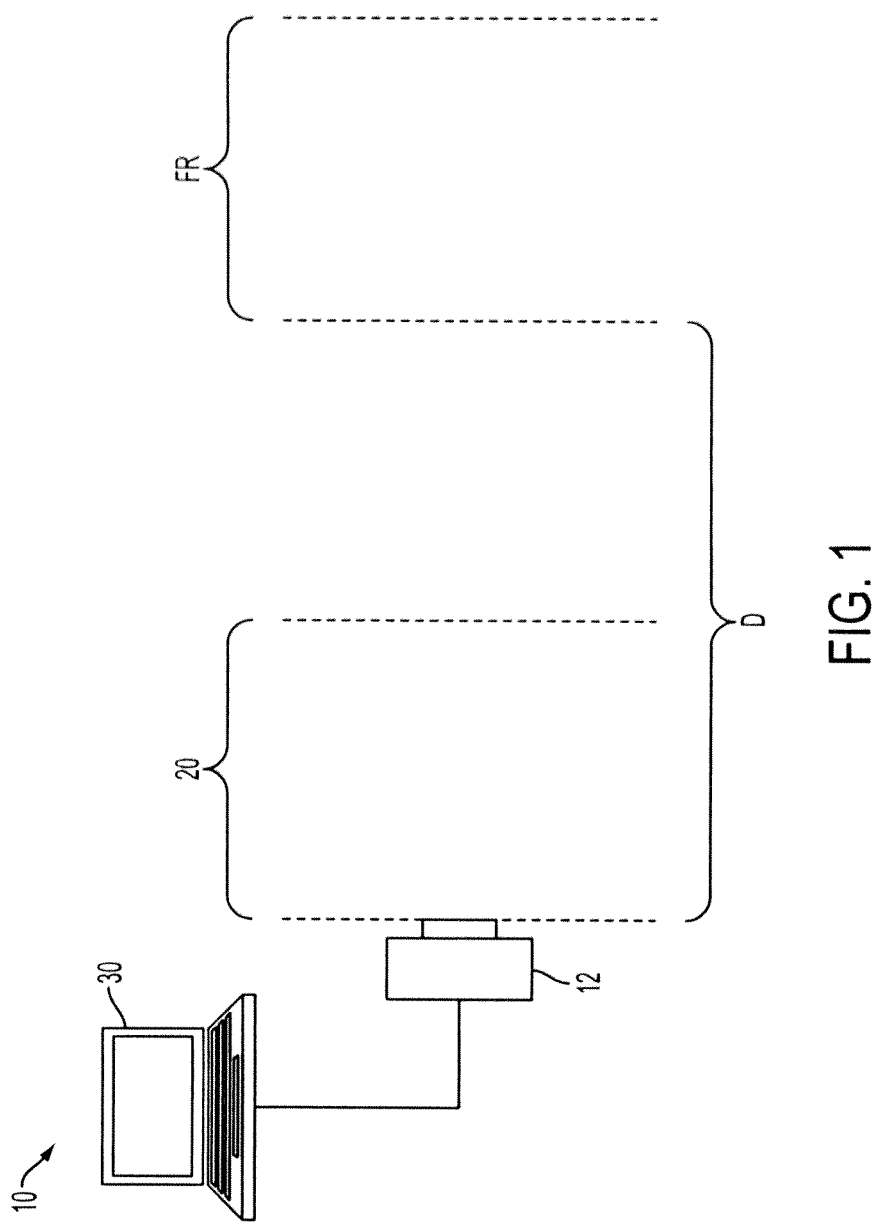
FIG. 1 is a diagrammatic illustration showing an exemplary camera system suitable for practicing aspect of the present inventive subject matter.

With reference now to FIG. 1, an automated and/or unattended camera system 10 includes a camera 12 for selectively capturing and/or obtaining an image of a scene within the camera's FoV. In practice, the camera 12 may be a digital camera and may be either a still picture camera or a video camera. When referring herein to a captured or otherwise obtained image from the camera 12, it is intended to mean an image from a picture camera or a still frame from a video camera.

As shown in FIG. 1, the camera 12 has an effective focal range FR beginning at some distance D from the camera 12. Objects within the FR are generally in focus, while objects outside the FR are generally out of focus. In-focus objects or regions in an image captured by the camera 12 will generally appear sharp and/or crisp (e.g., with well-defined edges and/or high local gradients), while out-of-focus object or regions in an image captured by the camera 12 will generally appear blurry and/or fuzzy (e.g., without well-defined edges and/or low local gradients). For example, objects and/or regions in the camera's FoV that are sufficiently outside the FR and near the camera 12, e.g., in a near-field 20 of the camera's FoV, will generally be out-of-focus. Objects in the near-field 20 of the camera's FoV are nominally referred to herein as near-field obstructions. Typical near-field obstructions include but are not limited to: plant growth and/or foliage; ice build-up on the camera lens or porthole; graffiti or debris on the camera lens or porthole; etc.

In the illustrated embodiment, the system 10 further includes a computer 30 or the like that is remotely or otherwise in communication with the camera 12. Suitably, the computer 30 obtains or otherwise receives and analyzes images captured by the camera 12 in order to automatically monitor, detect and/or report near-field obstructions. In practice, the image obtained or received and analyzed by the computer 30 is a digital image, e.g., captured by a digital camera. Optionally, the computer 30 may receive an analog feed which is in turn digitized to obtain a digital image for analysis. In one suitable embodiment, the computer 30 obtains or receives and analyzes essentially all the images captured by the camera 12. Alternately, the computer 30 may obtain or receive and analyze a representative sample or other subset of the images captured by the camera 12 at periodic or intermittent intervals or otherwise chosen times. Suitably, the images may be transmitted from the camera 12 to the computer 30 and/or analyzed in real time or near real time or in batches or otherwise.

Figure 2:
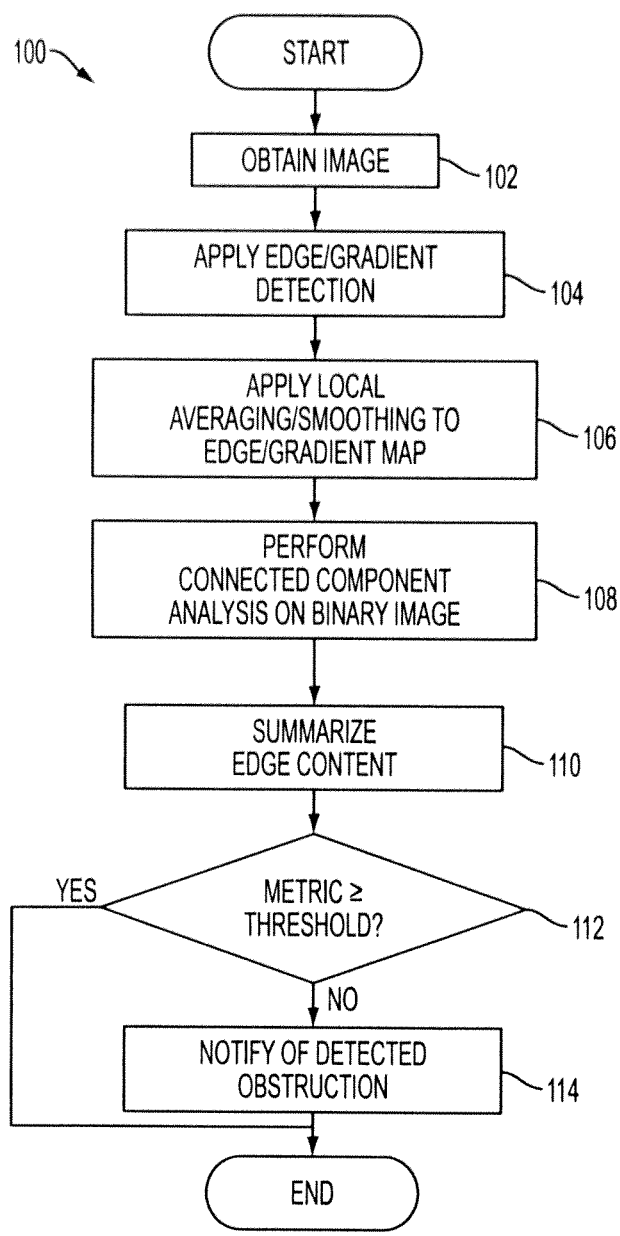
FIG. 2 is a flow chart illustrating an exemplary process for analyzing an image in accordance with aspects of the present inventive subject matter.
Figure 3:
FIG. 3 is an illustration showing an exemplary image suitable for analysis in accordance with aspect of the present inventive subject matter.

With reference now to FIG. 2, there is shown a flow chart illustrating an exemplary process 100 by which the obtained or captured images are analyzed, e.g., by the computer 30. For purposes of the present example, reference is also made to FIG. 3 which shows an exemplary image 200 captured by the camera 12 and that may be so analyzed. In particular, the image 200 includes a near-field obstruction 202, which in this case is plant foliage. Notably, the near-field obstruction 202 appears out-of-focus, e.g., as compared to the remainder of the image 200.

As shown in step 102, an image is obtained. For example, the image 200 may be captured by the camera 12 and transmitted to the computer 30 for analysis.

Figure 4:
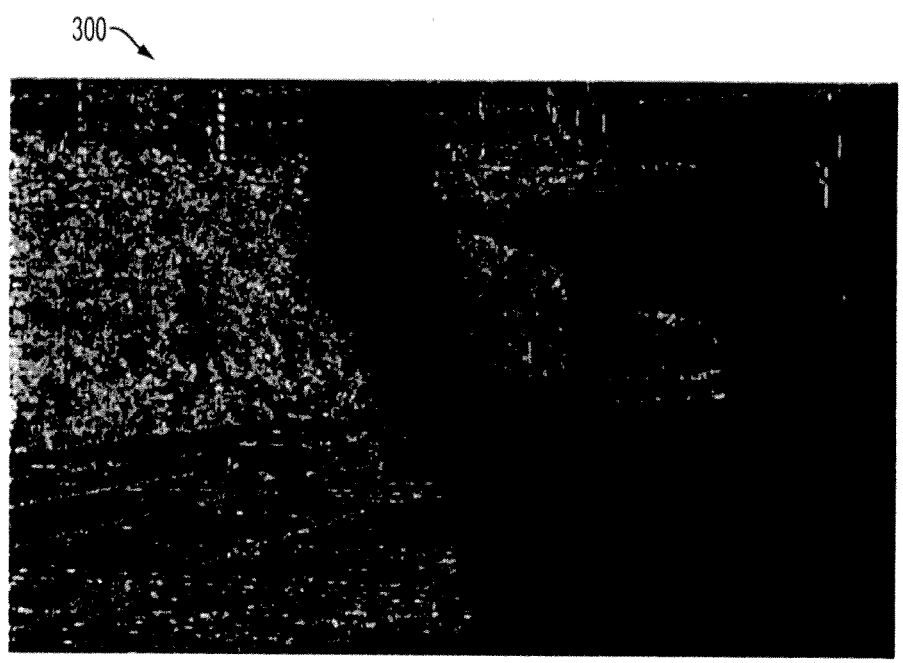
FIG. 4 is an illustration showing a resulting edge and/or gradient map generated from the image shown in FIG. 3 as produced in accordance with aspects of the present inventive subject matter.

At step 104, edge or gradient detection is applied to the obtained image, e.g., to generate and edge or gradient map 300 such as the one shown in FIG. 4. As shown, the light or white pixels represent edge pixels, i.e., pixels having a high gradient or value difference with respect to neighboring pixels, and the dark or black pixels represent non-edge pixels, i.e., pixels having a low gradient or value difference with respect to neighboring pixels. Suitably, a gradient-base edge detector, e.g., such as a Sobel edge detector, is employed. Alternately, a soft-edge detector, e.g., such as a Canny edge detector may be used. However, the latter employs thresholding with hysteresis on the intensity gradient image while tracing edges to enforce edge continuity. Thus, it may include pixels as edge pixels that are relatively low in local gradient intensity. Regardless, it is notable in the gradient map 300 that a relatively continuous dark area 302 (e.g., as compared to the remainder of the gradient map 300) corresponds to essentially the same area as the near-field obstruction 202 in the image 200.

At step 106, local averaging or similar processing is applied to the edge or gradient map, e.g., to smooth out the spurious nature of edge pixels. Suitably, this is accomplished by defining a local window of suitable size, e.g., centered around a pixel (i,j) of the edge map. In practice, the window may then be moved or advance over successive pixels in the edge map. Suitably, for a given pixel (i,j) around which the window is placed, a binary value is assigned thereto depending upon whether or not an edge pixel resides within the window. For example, a value of 1 may be assigned to a pixel (i,j) centered in the window, if an edge pixel resides anywhere in the window, otherwise a value of zero may be assigned to the pixel (i,j) centered in the window, if an edge pixel does not reside anywhere in the window. The window may then be moved or advanced to be centered or otherwise placed around the next pixel in the edge map which is in turn likewise assigned a binary value. In this manner, a binary image (i.e., a localized edge or gradient density map) may be generated where the pixel values represent or indicate a local edge content.

At step 108, connected component analysis is applied to the binary image to identify clusters or connected or neighboring groups of pixels therein corresponding to edge-free regions. That is to say, the connected component analysis identifies cluster of pixels having like binary values indicative of edge-free content (e.g., having a binary value of zero in the present example). In this manner, region of significant size in the image are found which lack high frequency content or large gradient changes.

At step 110, the edge content is suitably summarized to generate an overall edge or gradient density metric. In practice, the edge content may be summarized by calculating or otherwise determining a scalar value which measures or otherwise represents the amount of edge-free regions identified by the connected component analysis, e.g., as a percentage of the total image area.

At decision step 112, the metric result (e.g., the generated scalar value) is compared to a set or otherwise determined threshold or threshold condition. If the former does not satisfy the threshold condition (e.g., if the metric result or scalar value is lower than the threshold), then a near-field obstruction may be deemed to have been detected and the process 100 may continue to step 114, otherwise if the former does satisfy the threshold condition (e.g., if the metric result or scalar value meets or exceeds the threshold), then a near-field obstruction may not be deemed to have been detected and the process 100 may end.

In one suitable embodiment, an appropriate threshold may be learned and/or set or determined based upon a statistical analysis of a set of training images obtained with and without near-field obstructions. For example, each training image may be subjected to the process 100 or a similar process in order to generate an overall edge or gradient density metric therefor (such as the aforementioned scalar value). Accordingly, a nominal distribution of the metrics obtained from the training images may be produced, and based on this distribution, a suitable threshold may be determined or selected.

At step 114, a suitable notification of the detected near-field obstruction is provided. For example, the computer 30 may provide such a notification by way of a visual indication, audible signal, display or sending of a suitable message, activation of a humanly perceivable alert or alarm, etc.

Under certain conditions, edge density may not always exhibit suitable homogeneity in region of interest in an image scene. For example, sun glare and/or overexposure during daytime may reduce the overall or local edge density. Accordingly, certain conditions may optionally be detected before applying the process 100 to an image. For example, an image may be subjected to suitable algorithms, processes and/or analysis to detect sun glare and/or overexposure and/or other errors (e.g., which could potentially invalidate the results and/or otherwise interfere with the process 100), and if no such conditions are detected, then analysis in accordance with the process 100 may be executed, otherwise if one or more of such conditions are detected, then execution of the process 100 may be forgone.

The above elements, components, processes, methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the computer 30 may include a processor, e.g., embodied by a computing or other electronic data processing device, that is configured and/or otherwise provisioned to perform one or more of the tasks, steps, processes, analysis, methods and/or functions described herein. For example, the computer 30 or other electronic data processing device employed in the system 10 may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for detecting an obstruction within a field of view of a camera from an image captured by the camera, said method comprising:
   analyzing the image, said analyzing of the image comprising:
      applying edge detection to the image;
      identifying regions of the image lacking edge content; and,
      comparing a size of the identified regions to a threshold; and
   determining if there is an obstruction based upon a result of said comparison.

2. The method of claim 1, wherein applying said edge detection generates an edge map including a plurality of pixels, where each pixel may be either an edge pixel or not an edge pixel, and said analyzing further comprises:
   local smoothing of said map.

3. The method of claim 2, wherein said local smoothing comprises:
   placing a window around a given pixel of the map;
   assigning a value associated with the given pixel based upon whether or not any pixel within the window is an edge pixel; and
   repeating said placing and said assigning for successive pixels of the map.

4. The method of claim 3, wherein said identifying comprises:
   performing connected component analysis on the smoothed map.

5. The method of claim 1, wherein said analyzing further comprising:
   generating a scalar value which represents the size of the identified regions.

6. The method of claim 5, wherein the scalar value is a percentage relative to an entire area of the image.

7. The method of claim 1, wherein said threshold is selected based on a statistical analysis of a set of training images including at least one image obtained by a camera with an obstruction in its field of view and at least one image obtained by a camera without an obstruction in its field of view.

8. The method of claim 1, said method further comprising:
   providing notification of a detected obstruction.

9. An apparatus that executes the method of claim 1.

10. A non-transitory machine-readable medium including a computer program which when executed performs the method of claim 1.

11. A method for detecting an obstruction within a field of view of a camera from an image captured by the camera, said method comprising:
   analyzing the image with a computer processor to identify regions of the image which are out of focus;
   comparing a size of the identified regions to a threshold; and
   determining if there is an obstruction based upon a result of said comparison.

12. A camera system comprising:
   a camera that obtains an image; and
   an image processor that analyzes said image to determine if there is an obstruction in the camera's field of view, wherein said analyzing includes:
      applying edge detection to the image;
      identifying regions of the image lacking edge content;
      comparing a size of the identified regions to a threshold; and
      determining if there is an obstruction based upon a result of said comparison.

13. The camera system of claim 12, wherein applying said edge detection generates an edge map including a plurality of pixels, where each pixel may be either an edge pixel or not an edge pixel, and said analyzing further comprises:
   local smoothing of said map.

14. The camera system of claim 13, wherein said local smoothing comprises:
   placing a window around a given pixel of the map;
   assigning a value associated with the given pixel based upon whether or not any pixel within the window is an edge pixel; and
   repeating said placing and said assigning for successive pixels of the map.

15. The camera system of claim 14, wherein said identifying comprises:
   performing connected component analysis on the smoothed map.

16. The camera system of claim 12, wherein said analyzing further comprising:
   generating a scalar value which represents the size of the identified regions.

17. The camera system of claim 16, wherein the scalar value is a percentage relative to an entire area of the image.

18. The camera system of claim 12, wherein said threshold is selected based on a statistical analysis of a set of training images including at least one image obtained by a camera with an obstruction in its field of view and at least one image obtained by a camera without an obstruction in its field of view.

* * * * *